US006631581B2

(12) United States Patent
Gomes et al.

(10) Patent No.: US 6,631,581 B2
(45) Date of Patent: Oct. 14, 2003

(54) FISHING LURE AND METHOD OF USING SAME (75) Inventors: Chad Gomes, Philadelphia, PA (US); Brett Thibodeau, Arlington, VA (US); Chris Yatsko, Blue Bell, PA (US)

(73) Assignee: Advanced Angling Concepts, LLC, Philadelphia, PA (US)

( * ) Notice: Subject to any disclaimer, the term of this patent is extended or adjusted under 35 U.S.C. 154(b) by 0 days.

(21) Appl. No.: 10/246,033

(22) Filed: Sep. 18, 2002

(65) Prior Publication Data

US 2003/0056422 A1 Mar. 27, 2003

Related U.S. Application Data (60) Provisional application No. 60/323,892, filed on Sep. 21, 2001.

(51) Int. Cl.[7] .............................................. A01K 85/00
(52) U.S. Cl. ...................... 43/26.2; 43/42.02; 43/42.09; 43/42.16
(58) Field of Search ................ 43/42.02, 26.2, 43/26.1, 42.09, 42.16, 42.47, 42.48

(56) References Cited

U.S. PATENT DOCUMENTS

| 726,021 | A | * | 4/1903 | Bryan | 43/26.2 |
|---|---|---|---|---|---|
| 1,694,195 | A | * | 12/1928 | Watts | 43/42.02 |
| 1,740,521 | A | * | 12/1929 | Nelson | 43/26.2 |
| 1,758,160 | A | * | 5/1930 | Lee | 43/42.02 |
| 1,840,854 | A | * | 1/1932 | Smith | 43/26.2 |
| 2,097,986 | A | * | 11/1937 | McEwen | 43/26.2 |
| 2,418,527 | A | * | 4/1947 | Riggan | 43/26.2 |
| 2,468,877 | A | * | 5/1949 | Horton | 43/26.2 |
| 2,794,287 | A | * | 6/1957 | Mancusi, Jr. | 43/42.02 |
| 2,816,391 | A | * | 12/1957 | Michael | 43/26.2 |
| 2,917,859 | A | * | 12/1959 | Troyer | 43/26.2 |
| 3,007,276 | A | * | 11/1961 | Lidert | 43/26.2 |
| 3,077,698 | A | * | 2/1963 | Glass et al. | 43/26.2 |
| 3,124,891 | A | * | 3/1964 | Van Sant | 43/26.2 |
| 3,505,753 | A | * | 4/1970 | Henderson | 43/26.2 |
| 4,245,421 | A | * | 1/1981 | Phillips | 43/42.47 |
| 5,035,075 | A | * | 7/1991 | Pearce | 43/42.02 |
| 5,088,226 | A | * | 2/1992 | Bazinet | 43/42.47 |
| 5,490,347 | A | * | 2/1996 | Conley | 43/42.47 |
| 5,694,714 | A | * | 12/1997 | Basso et al. | 43/26.2 |

* cited by examiner

Primary Examiner—Darren W. Ark
(74) Attorney, Agent, or Firm—Morgan, Lewis & Bockius LLP (57) ABSTRACT A fishing lure having a body section coupled to a fishing line that pulls the lure through water. An energy storage device is positioned in the body section and coupled to a propeller. The energy storage device stores potential energy as the lure is pulled through the water.

12 Claims, 8 Drawing Sheets

FISHING LURE AND METHOD OF USING SAME

CROSS-REFERENCE TO RELATED APPLICATION

This application claims priority to U.S. Provisional Patent Application Serial No. 60/323,892, filed Sep. 21, 2001, incorporated herein in its entirety by reference.

FIELD OF THE INVENTION

This invention relates to fishing equipment, and more particularly, to fishing lures.

BACKGROUND OF THE INVENTION

According to the American Sport Fishing Association, in 2000 there were over 30 million freshwater anglers in the United States that accounted for a significant portion of the $28 billion sportfishing industry. Anglers are constantly searching for technological advances and advantages to catch fish and to compete in catching fish against other anglers. Examples of such technological advances include scent-impregnated lures and high-tech fish finders, which tend to increase the effectiveness of the angler. Tournament fishing represents a considerable impetus for the sportfishing industry. In tournament fishing, the competitors desire to gain any advantage over other competitors to catch a greater number of and/or larger fish.

Though there are hundreds of lure manufacturers and thousands of freshwater sportfishing lures, there are only a handful of widely recognized categories of lures. Furthermore there are only a small number of dominant lure companies for each category. Saltwater fishing also has its particular lures that are configured to attract salt water fishes. The categories of lures include, but are not limited to, crankbaits, spinnerbaits, soft-plastic lures, jigs, topwaters, and spoons. Crankbaits are formed as a hard plastic diving lure. Spinnerbaits are lures that include spinning blade(s) to provide slight undulations of the lure that mimic a small fish swimming. Soft-plastics lures typically take the form of rubber worms, lizards, etc. Jigs take the form of heavy lures that extend vertically from the fishing line in the water. Topwaters are lures that float on the surface of the water. In general, most anglers have several lures from each of these categories in their tackle box, wherein each lure may be preferred for specific fishing situations or for a particular type of fish.

Though there are a large variety of lures, fishermen reel in the fishing line attached to the lures to retrieve these lures. As such, the lures travel across a strike zone in a single direction, i.e., toward the fisherman. It may be desirable to maintain the lures within a strike zone of the fish for longer period, thereby enhancing the possibility that the fish will strike. It may also be desired to position the lure in a location that is difficult to reach by reeling in the fishing line. For example, an underside of a log or the side of any object facing where the fisherman is located may provide fertile fishing grounds. However, allowing the fisherman only the ability to retract the line limits the ability of the fisherman to position the lure in these locations.

Therefore it may be desirable to provide a fishing lure that can be moved, or would move itself, in a direction substantially away from the fisherman. It would also be desirable to provide fishing lures that follow interesting movements for fish, or remain within the fish strike zone for an extended period compared to traditional fishing lures.

SUMMARY OF THE INVENTION

The present invention is directed to a fishing lure having a body section coupled to a fishing line that pulls the lure through water. An energy storage device is positioned in the body section and coupled to a propeller. The energy storage device stores potential energy as the lure is pulled through the water.

In a particular embodiment, the energy storage device is a spring, and the spring is connected to the propeller. In this embodiment, the propeller rotates in a first rotational direction and thereby winds the spring, as the lure is pulled by the fishing line in the forward direction through the water. When the tension on the fishing line is relaxed, the spring unwinds, thereby turning the propeller in a second rotational direction (opposite the first rotational direction.) As the spring unwinds, the potential energy stored in the spring is converted into kinetic energy that applies a force in the reverse direction to the lure.

In one embodiment, after the potential energy is stored in the energy storage device, the potential energy is later used to turn the propeller in a manner that propels the lure a reverse direction through the water. In an alternative embodiment, after the potential energy is stored in the energy storage device, the potential energy is used to turn the propeller in a manner that maintains the lure in a substantially stationary position in the water. In this alternative embodiment, the fishing lure remains in a substantially stationary position in the water by converting the potential energy into kinetic energy that supplies a force that balances an equal and opposite force supplied by the fishing line.

The spring may be housed in a gear box that includes a slip clutch that prevents the spring from winding beyond a threshold tension. The gear box includes a plurality of gears that achieve some turning ratio between the propeller and the spring. In one embodiment, this turning ratio is at least 30:1.

The gear box may be positioned in a corresponding opening in the body section, and the body section may include fins that prevent the lure from rotating about the turning axis of the propeller.

In accordance with a further aspect, the present invention is directed to a method for fishing. The method includes (a) pulling a fishing lure through water in a forward direction, (b) storing potential energy in the lure during the pulling step, and (c) relaxing tension on the fishing line coupled to the lure. After the relaxing step, the potential energy stored in the lure is converted into kinetic energy that alters the movement of the lure in the water. The kinetic energy may propel the lure in a reverse direction in the water. Alternatively, the kinetic energy may supply a force that balances an equal and opposite force supplied by the fishing line.

BRIEF DESCRIPTION OF THE DRAWINGS

The accompanying drawings, which are incorporated herein and constitute part of this specification, illustrate the presently preferred embodiment of the invention.

Throughout the figures, unless otherwise stated, the same reference numerals and characters, are used to denote like features, elements, components or portions of the illustrated embodiments.

DETAILED DESCRIPTION OF THE EMBODIMENT

Figure 1:
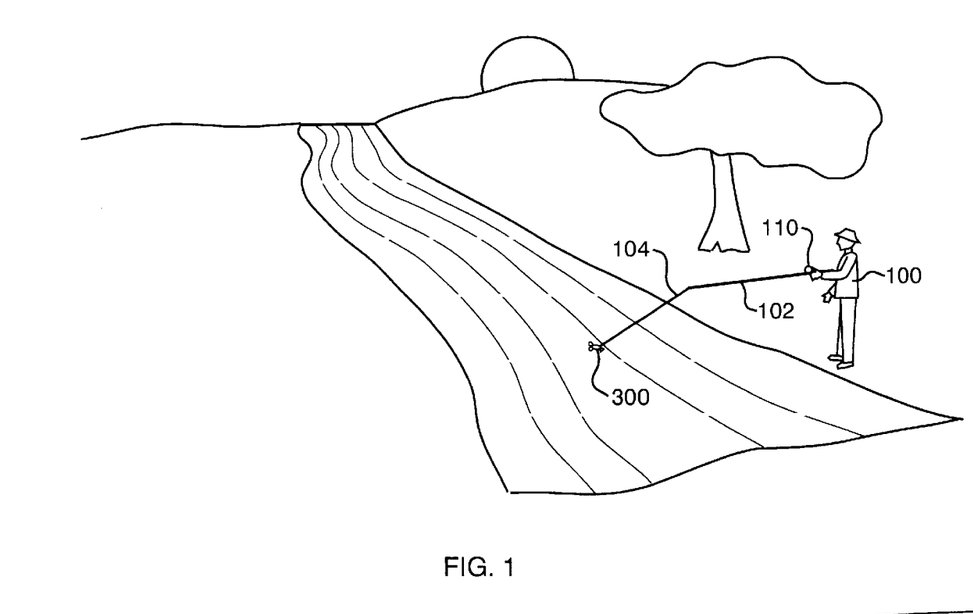
FIG. 1 shows one fishing situation where the lure of the present invention may be used.

There are a variety of techniques by which fishermen can fish. One type of fishing is performed as shown in FIG. 1 in which the fisherman 100 stands on the bank of a river or other body of water (or stands in the water) and casts a lure 300 from a fishing pole 102. Lure 300 is connected to the pole by a fishing line 104 using eyelet 393 (shown in FIG. 4.) One or more hooks 390 (shown in FIG. 4) are attached to the lure 300 using eyelets 392. A reel 110 is connected to the fishing pole 102, and used to reel in the fishing line 104. In the fishing technique shown in FIG. 2, the fisherman 100 is positioned in a boat 120. The boat 120 is preferably anchored or drifting through the water. In this disclosure, the terms "fisher", "fisherman", "angler", etc. are used interchangeably.

FIGS. 3, 4, 5 and 6 respectively show isometric, side, rear and exploded views of fishing lure 300, in accordance with the present invention. Lure 300 includes a propeller 308. As lure 300 is pulled in a forward direction (i.e., generally toward the fisherman) through the water by tension in fishing line 104, the force of the water moving past propeller 308 causes the propeller to rotate in a first rotational direction. As propeller 308 turns in the first rotational direction, a shaft 309 coupled to and aligned along the rotational axis of the propeller 308 turns gears 402, 404 and 406 (shown in FIG. 7) which, in turn, wind a spring 410 positioned in the body section 302 of lure 300. As the spring 410 is wound during the pulling of the lure 300 in the forward direction, potential energy originally obtained from the propeller is thus stored in the spring 410. The spring 410 may be considered as one embodiment of an "energy storage device" that stores potential energy originally obtained from rotation of propeller 308 as the lure 300 is pulled in the forward direction through the water. Use of energy storage devices other than springs (e.g., rubber bands, electric cells or batteries, or flywheels, charged by rotation of propeller 308, etc.) are considered within the scope of the present invention. In addition, although in the embodiment shown propeller 308 has propeller blades that are maintained at a fixed pitch during use of lure 300, a propeller with variable-pitch blades could also be used for implementing the present invention.

When lure 300 is not being pulled through the water, a fisherman may allow the tension in fishing line 104 to begin to relax, and slack may form in the line 104. As the tension in the line 104 relaxes, spring 410 begins unwinding, thereby turning the propeller 308 in a second rotational direction (opposite the first rotational direction.) As spring 410 unwinds, the potential energy stored in the spring is converted into kinetic energy that applies a force to lure 300 in the reverse direction (i.e., away from the fisherman). In the embodiment shown in FIG. 4, the reverse direction is completely opposite the forward direction. In other embodiments, the reverse direction is different from, but not necessarily completely opposite, the forward direction.

Lure 300 may raise an angler's effectiveness and efficiency by increasing the duration that their lure maintains motion while staying within a strike zone near the game fish. Lure 300 will provide a significantly increased fish yield in many situations, and will prove exciting to fishermen since the fishermen have more control over the positioning and movement of the lure within the water. Motion of many embodiments of lure 300 by the propeller creates unique and erratic movements that are particularly attractive to gamefish. In addition, the propulsion provided by the propeller 308 allows lure 300 to remain within the strikezone for longer periods while providing considerable increased motion compared with traditional lures. Among other things, the wind-up and reverse propulsion mechanism in the lure 300 may allow the lure to draw closer to (and in some cases even bump into) underwater objects where fish are often present (e.g., a log). Lure 300 may be considered to behave dynamically under water in a manner similar to a crankbait or spinnerbait.

Lure 300 may be formed using materials such as wood, soft plastic, rubber, hard plastic, etc. In one embodiment shown in FIGS. 3–6, lure 300 includes an external lure body 302 formed of two hard plastic shell portions 304, 306. The shell portions 304, 306 together may form an air-tight pocket that provides a positive buoyancy when lure 300 is immersed in water. Alternatively, lure body 302 may have a neutral or negative buoyancy in the water.

The lure includes outer fins 320. 322, that cause lure 300 to resist rotation about the axis of propeller 308 during winding and unwinding of the spring 410. The purpose of the fins with the corresponding angles of termination toward the back of the lure body is to provide torque counter to the torque created by the turning propeller. The fins may be sized in any manner of ways to stabilize the propeller-induced torque on the lure. Other potential fins have more or less radical angles of termination (angled more radically away from the natural flow of the water over the lure), longer or shorter angled sections, longer or shorter straight sections, or rise to varying heights from the main body surface of the lure. The number of fins, three in the embodiment shown, can also vary from zero to dozens to produce the same results. The fins could also be "inverse" fins that are grooves cut into the main body of the lure, rather than protruding from the main body, and produce the same counter-torque results to stabilize the lure. These options are representative and not exhaustive. Weighting may also be added to the lure in a manner that causes the lure to resist rotation about the axis of the propeller.

Figure 7:
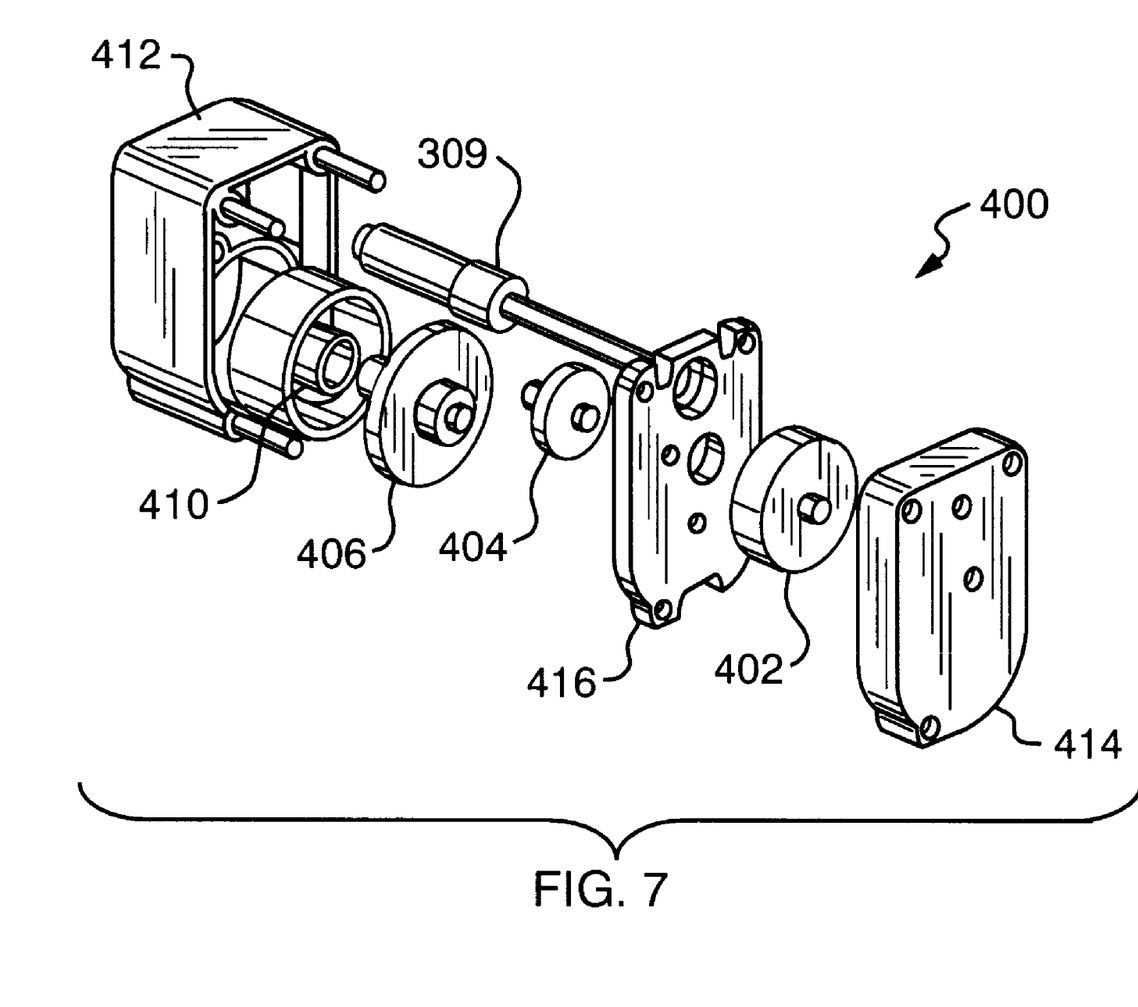
FIG. 7 shows an exploded view of the gear box illustrated in FIG. 6.
Figure 8:
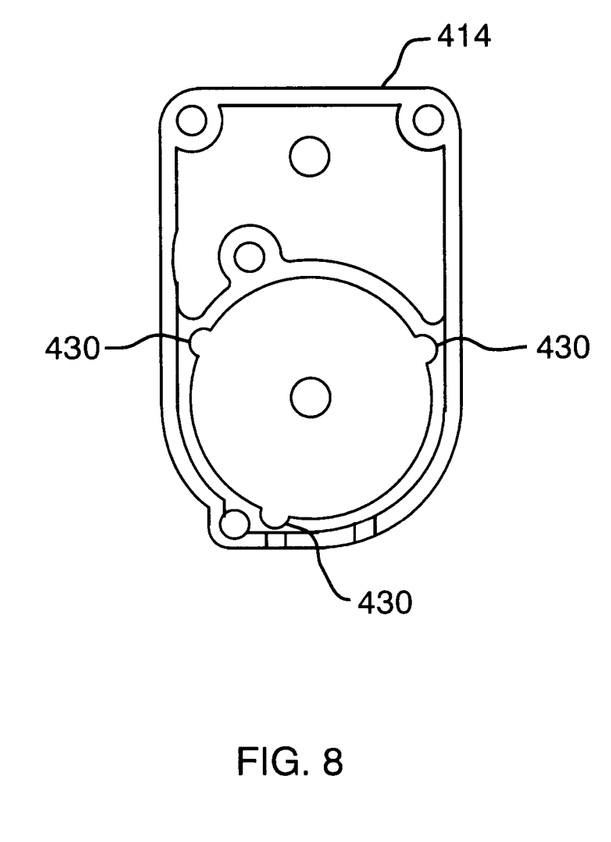
FIGS. 8 and 9 respectively show side and isometric views of the gear enclosure shown in FIG. 7.
Figure 9:
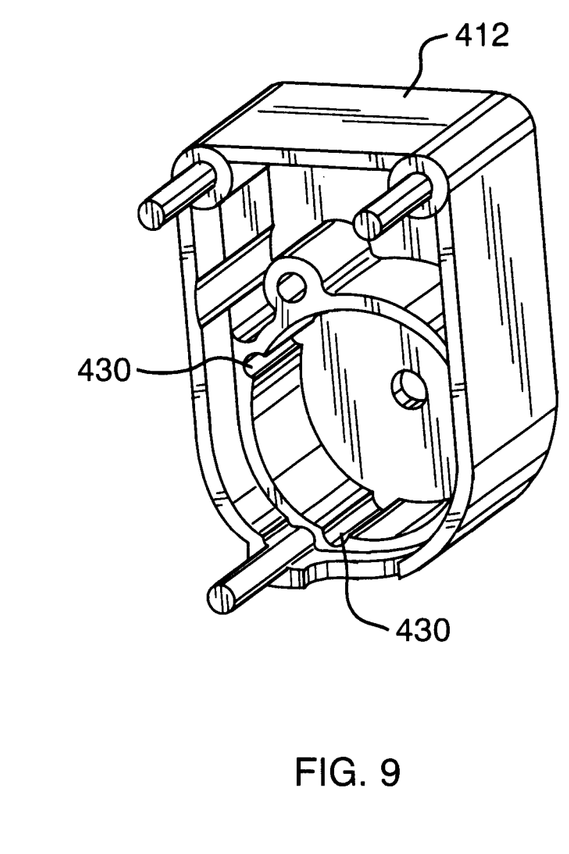

As shown in FIGS. 7–9, the lure includes a gear housing 400, formed from a front gear enclosure 412, a back gear enclosure 414, and a middle panel 416. The gear housing holds gears 402,404, 406 as well as the spring 410. When assembled, the gear on propeller shaft 309 contacts the rear of gear 402; the front of gear 402 contacts the rear of gear 404; the front of gear 404 contacts the rear of gear 406; and the front arbor of gear 406 engages the spring 410. The propeller shaft 309 passes through an opening in back enclosure 414. In the embodiment shown, gears 402, 404, 406 achieve a turning ratio between the propeller 308 and the spring 410 of at least 30:1. It is understood that other gear ratios are within the scope of the present invention, in one embodiment, gear box 400 is made waterproof by using seals and valves around the propeller shaft and closing up all other parts of the gear box.

Figure 10:
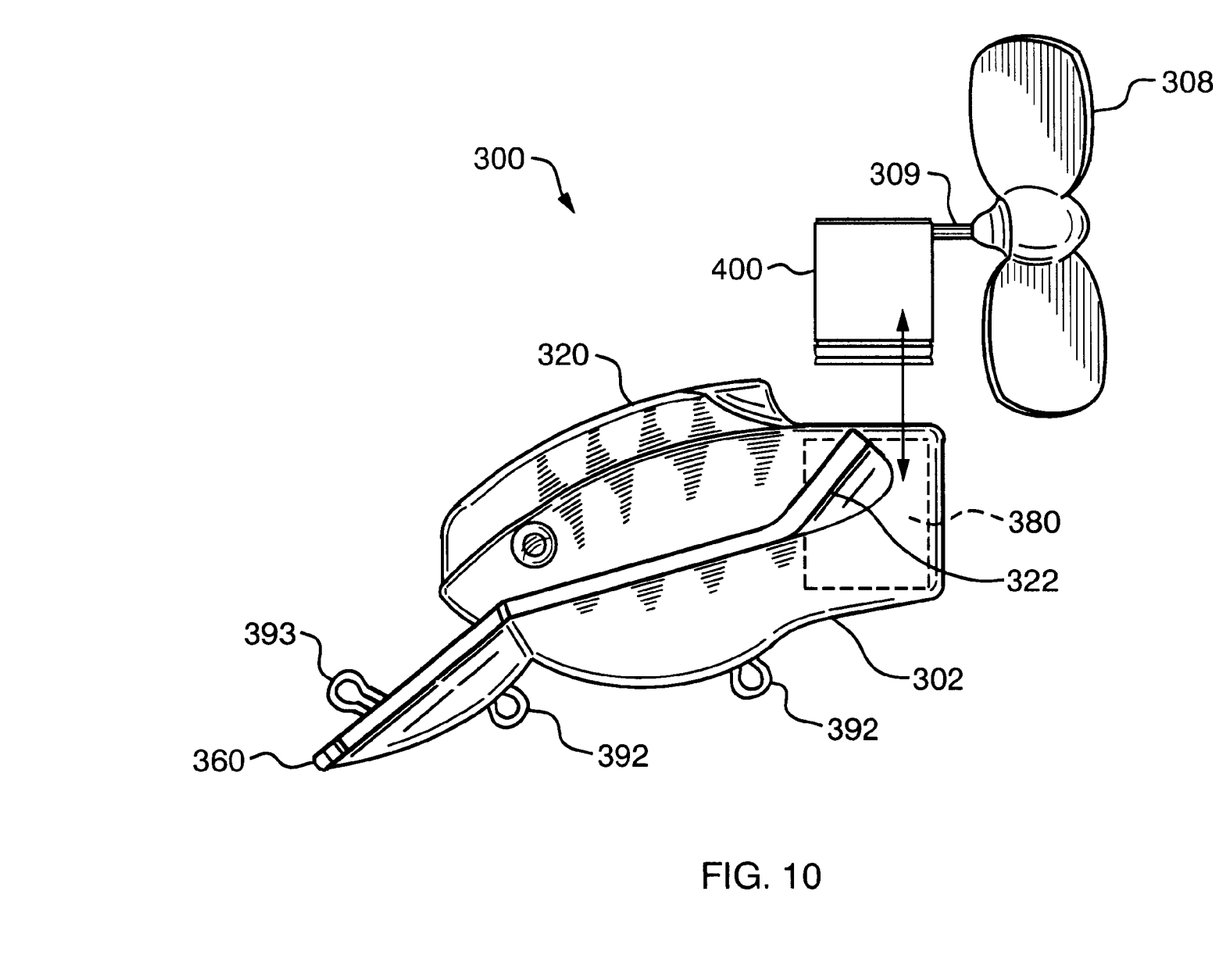
FIG. 10 shows a side view of a further embodiment of the fishing lure of the present invention, wherein the gear box is sized to fit within an opening in the lure body.

In one embodiment, the gear box 400 is sized to fit in an opening 380 in the lure body 302, and the gear box 400 is secured in opening 380 using either a friction fit or dimples 384 on lure body 302. Other potential design features for securing the gear box to the body, either internally or externally, may consist of a slide lock mechanism, a puzzle lock, or any other possible locking mechanism that would allow the gearbox to be secured to the body and removed by the fisherman when desired. The locking features may be comprised of dimples 384 or indents on the body and/or on the gearbox, metal or plastic hinges or snaps, springs or other types of locks. These options are representative and not exhaustive.

The fisherman may optionally be provided with a plurality of different gear boxes 400, each of which is connected to a different colored propeller 308. In this embodiment, the fisherman may configure his lure 300 for a particular fish by manually swapping gear boxes 400 so as to achieve a propeller color that will be attractive to the fish of interest. The other purpose of this embodiment is to allow fishermen to change gearboxes as they wear out, without needing to replace the entire lure. In this embodiment, the gear box 400 preferably snaps in/out of body 302 manually (by hand) for ease of assembly/removal by the fisherman.

In the embodiment shown in FIGS. 7–9, the gear housing 400 includes a slip clutch that prevents spring 410 from winding past a predefined maximum tension. The slip clutch is formed using semi-circular cut-outs 430 that mate with corresponding rounded edges (not shown) on the outside of spring 410. Cut-outs 430 hold the spring 410 in place while it is winding up to the predefined maximum tension. However, further winding of the spring 410 past this maximum tension causes the spring 410 to slip (or rotate) to the next set of cut-outs 430, thereby preventing (i) the tension in the spring from causing the body section 302 to rotate about the axis of the propeller, and (ii) the spring from breaking. In one embodiment, after being wound to the maximum tension and then released, the spring 410 delivers 0.3–0.6 ounce-inches of torque to propeller 308. Other torque ranges are considered to be within the scope of the present invention.

There are multiple configurations of springs, drives and gearing that can be applied to lure 300. For example, depending on the spring factor K or, in cases where a different potential energy storage device (e.g., rubber band, rechargeable battery, flywheel, etc.) is used, other drive and gearing systems may be required. For instance, a spring system can be designed using, e.g., spur and bevel gears of various sizes and ratios. Use of certain springs, such as a power spring or coil spring create an increasing torque as the propeller is rotated and the springs are wound. The embodiment of lure shown in FIGS. 3 to 9 uses a coil spring. Use of either type spring is considered to be within the scope of the present invention.

The piece extending from the front of the lure is called either a lip or a bib 360. The use of such a lip 360 is relatively common in a crank bait or hard plastic lure. It serves multiple purposes including determining the depth that the lure 300 will run. A short, very angled lip 360 for instance would be preferable for short depths. A flatter, longer lip 360 in general would be preferable for deeper depths. The lip 360 also is a factor in the stability or instability of the lure 300. The lip 360 or lure body configuration provides fluid instability that may be desired to provide wobble to the lure. Depending on where the lip 360 is positioned on the front of the lure 300, and the shape and size of the lip, the lure 300 can have more/less of a wobble. Lure 300 may connect to the fishing line 104 via the lip instead of some other position on the lure body. This generally provides more and/or a different wobble.

Although not shown, further triggering mechanisms for propulsion (beyond mere relaxation of tension on the fishing line) can be provided in certain embodiments of the lure of the present invention. For example, a triggering mechanism that required the fisherman to pull on the line after relaxation of tension on the line could be used. A triggering mechanism could alternatively be based on transmission of an electrical signal from a remote control operated by the fisherman to a receiver in the lure 300.

As shown in FIG. 10, in one embodiment, the lure body 302 is shaped to resemble various prey of a gamefish. Potential prey to be imitated include small fish (minnows, baitfish, baby bass, sunfish, perch, shad), crawfish, frogs, salamanders, etc. The lure body may be provided with various outer textures, finishes, colors, reflective or holographic materials, etc.

Hooks 390 could be attached to almost any location of the lure body 302 in a manner that allows the hooks to hang off the lure body. Fish hooks 390 are quite standardized and include, e.g. three-prong treble hooks. In the embodiment shown in FIG. 4, there are two hooks 390 for each lure. It may be desired, e.g., to position the hook a little bit more towards the front than normal for certain fishing situations. It may be desired to position the hooks further off the lure body for other fishing situations. There can be one hook in the middle of the bottom, and another hook on the back, for example. The hooks may be three-pronged, or some other configuration such as one or two-pronged. Hooks may also have weedless features.

Figure 2:
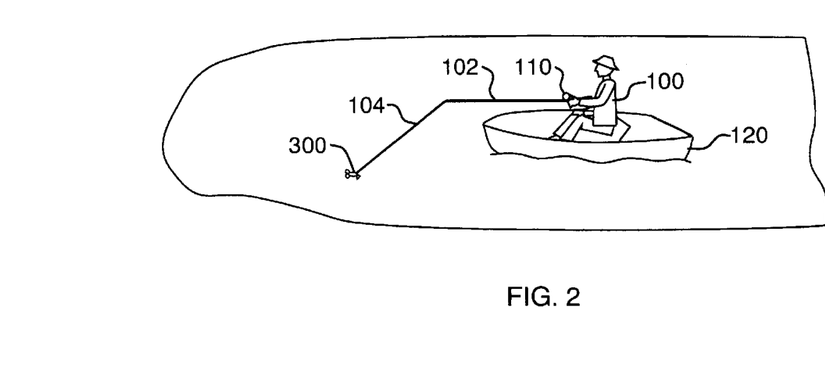
FIG. 2 shows another fishing situation where the lure of the present invention may be used.
Figures 3, 4:
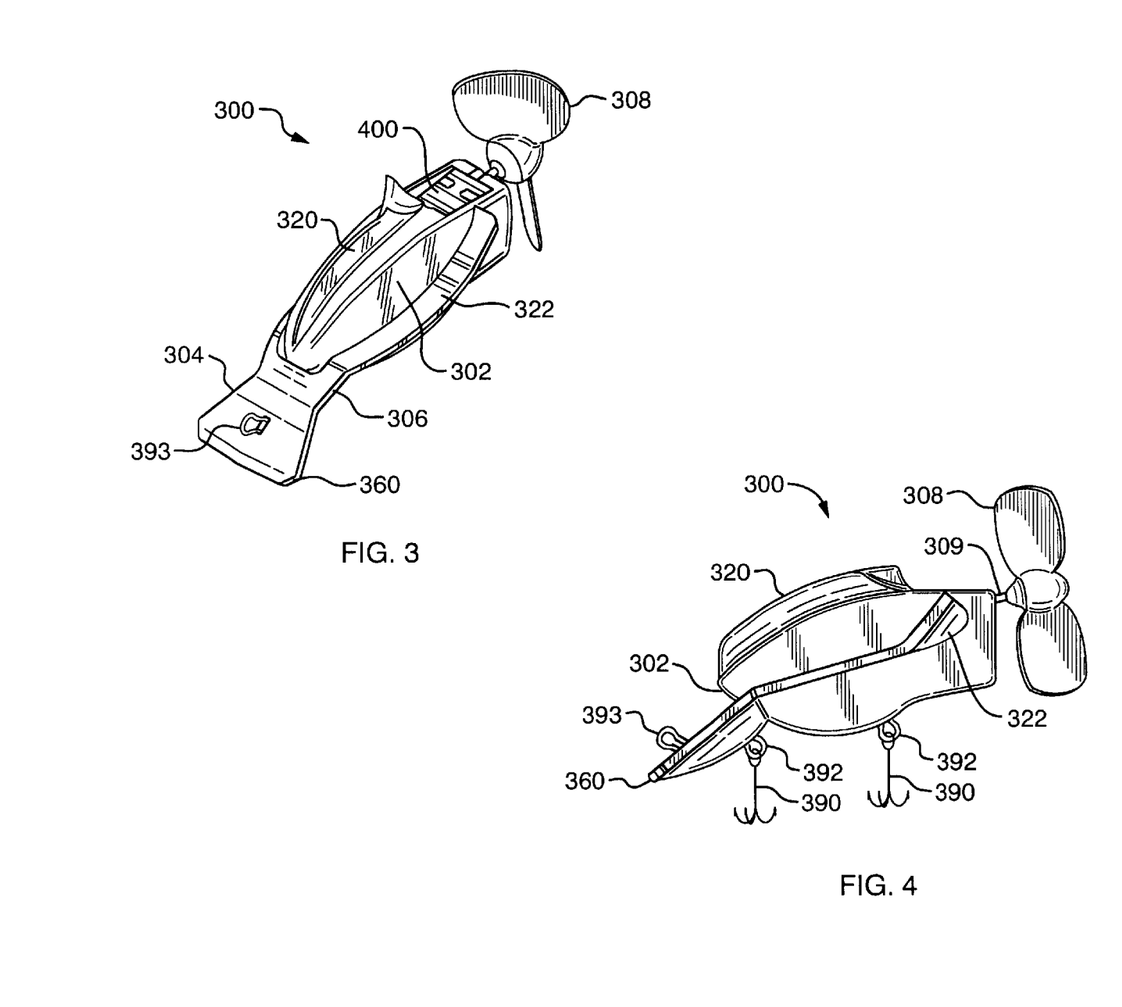
FIGS. 3, 4, 5 and 6 respectively show isometric, side, rear and exploded views of a fishing lure, in accordance with the present invention.
Figure 5:
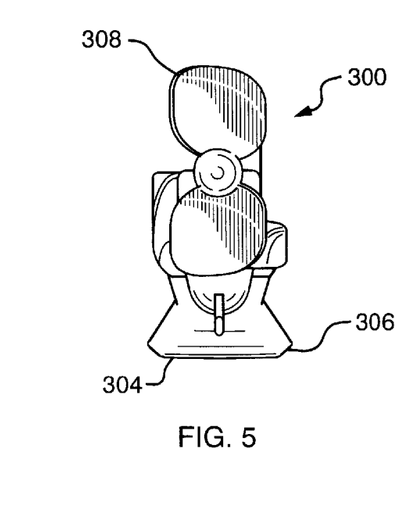
Figure 6:
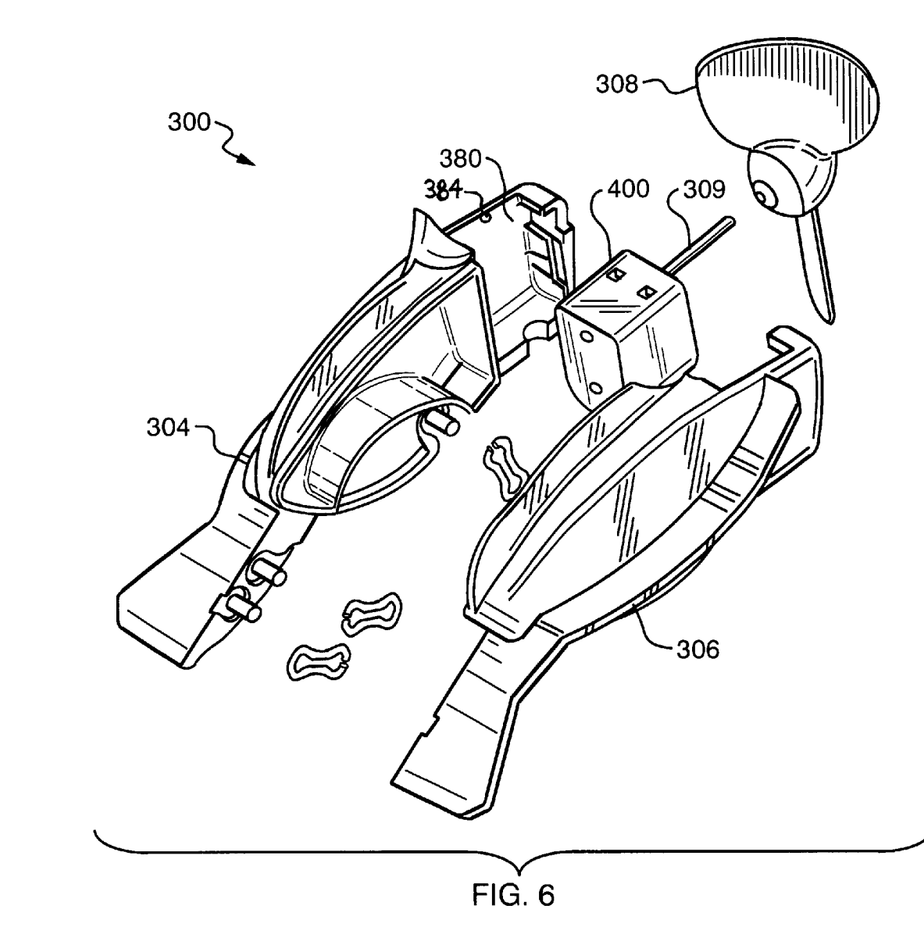
Figure 11:
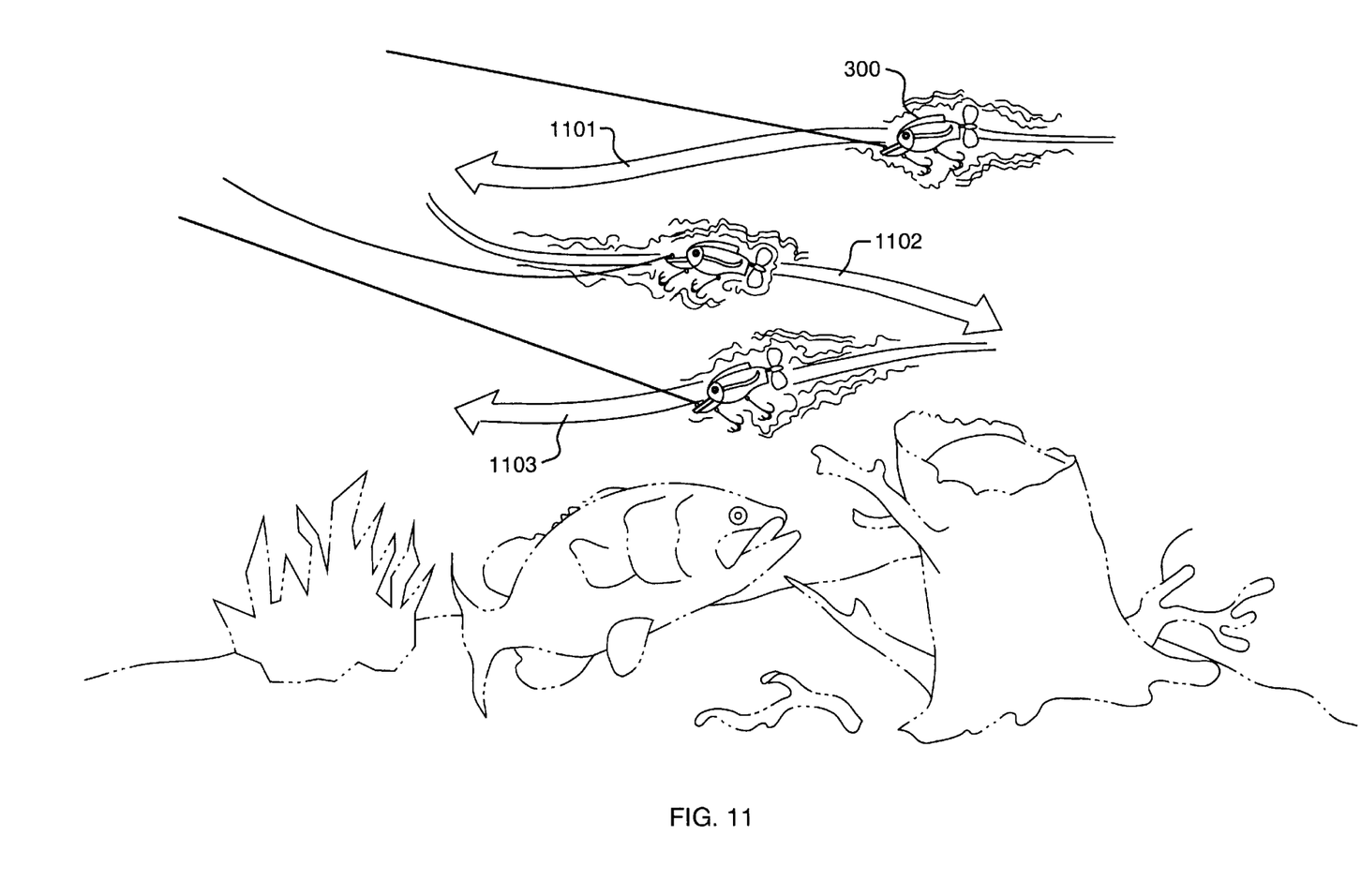
FIG. 11 shows one embodiment of a method of use of the lure of the present invention, where potential energy stored in the lure is later used to turn the propeller in a manner that propels the lure a reverse direction through the water.

During use of the present invention, the fisherman initially casts as shown in FIG. 1 or 2 the lure 300 into the water and begins retrieving the lure 300 by reeling in fishing line 104. FIG. 11 shows one progression that may be used by a fisherman using the lure 300. During the initial retrieve step 1101 shown in FIG. 11, the fisherman reels in the line 104 and therefore pulls the lure 300 through the water in the forward direction. The initial retrieve may occur, for example, at normal crank speed. During the initial retrieve, the force of the water against the propeller 308 causes the propeller 308 to turn, thereby causing potential energy to be stored in the spring 410. Once the fisherman retrieves the lure 300 several feet as shown in FIG. 11, the fisherman allows slack to form in the fishing line by, e.g., altering the position and/or angle of the fishing pole and/or letting out the fishing line. As the fishing line develops slack, there is no longer significant water pressure being applied to the blades of the propeller 308 since the lure is not being pulled through the water. At this point, the spring 410 begins to release its stored potential energy by driving the propeller 308 in the opposite direction, thereby powering the lure in the reverse direction. In step 1102, the reverse rotation of the propeller acts to drive the lure 300 through the water in the reverse direction (e.g., in a direction opposed to its direction of travel during retrieval.) After step 1102, the fisherman can in step 1103 continue to retrieve the lure in a manner that it would essentially "reload" the lure again. By performing steps 1101, 1102 and 1103 in sequence as shown in FIG. 11, the fisherman can move the lure past a fish three or more times while maintaining the lure in the strike zone of the fish.

Figure 12:
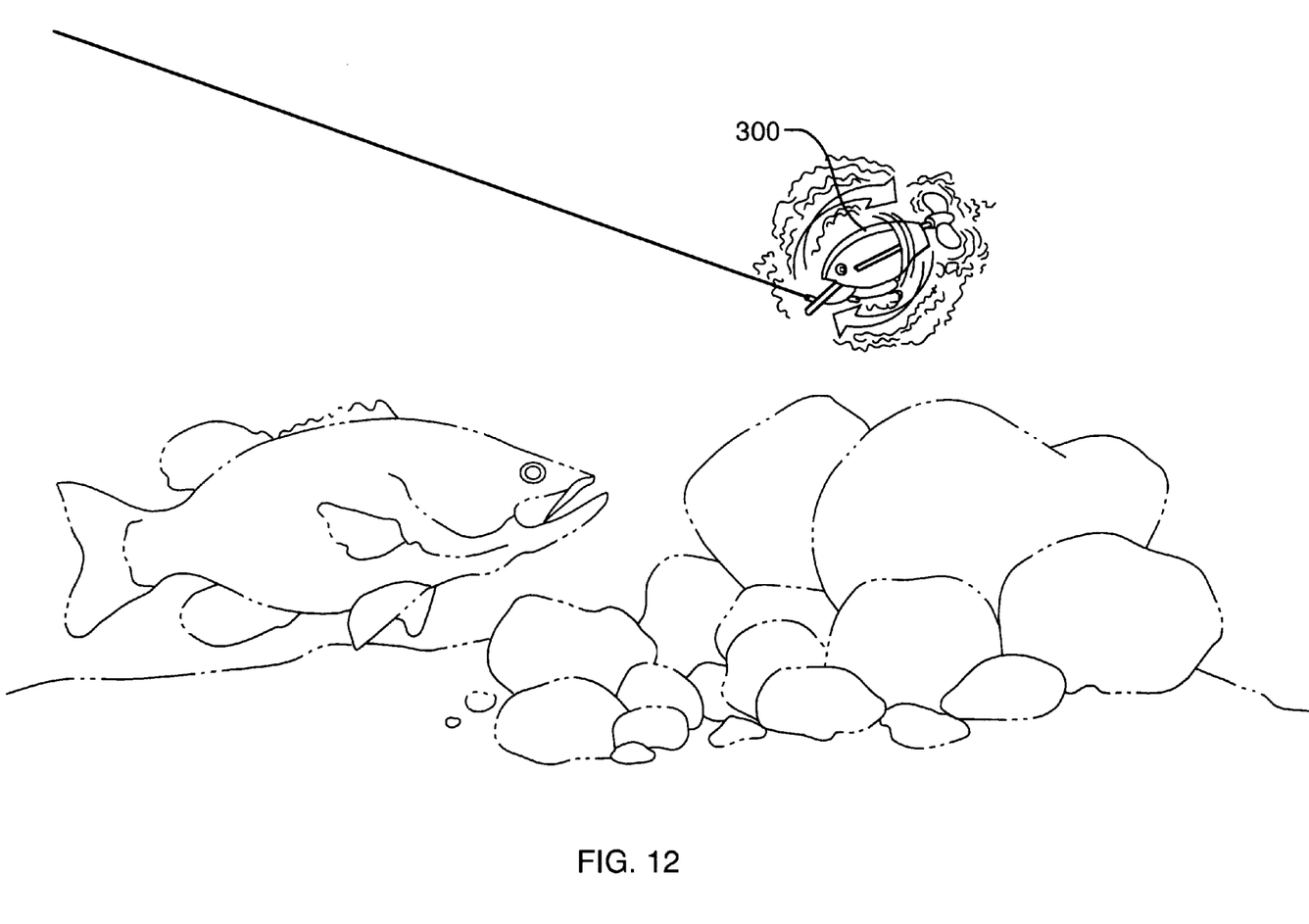
FIG. 12 shows a further method of use of the lure of the present invention, where potential energy stored in the lure is later used to turn the propeller in a manner that maintains the lure in a substantially stationary position in the water.

Another option of the use of the lure 300 is shown in FIG. 12, and may be referred to as the "sit and spin" mode of operation. In the sit and spin mode, the lure is pulled (or retrieved) through the water a sufficient distance to build up potential energy in the spring 410. Next, tension on the fishing line 104 is relaxed only partially to the point that retrieving of the lure ends but some tension on the line remains. At this point, the stored force in the spring begins to be released, thereby causing propeller 308 to begin to spin; however, the lure is limited from moving due to the tension still being applied by the fishing line. More particularly, in this mode, the lure remains in a substantially stationary position in the water by converting the potential energy from the spring into kinetic energy that supplies a force that balances an equal and opposite force supplied by the fishing line 104. Thus, in the sit and spin mode, the propeller spins but the lure remains in substantially the same location relative to the water. The rotation of the propeller provides some amount of wobble and flash that mimics the motion of fish. In this mode, the fisherman may try to position the lure near where the fisherman believes the fish to be and then let the lure "sit and spin" and wobble at that location.

While the principles of the invention have been described above in connection with the specific apparatus and associated method, it is to be clearly understood that this description is made only by way of example. It will be appreciated by those skilled in the art that changes could be made to the embodiments described above without departing from the broad inventive concept thereof. For example, the lure 300 can be designed to propel itself in various directions other than longitudinally (axially). These directions would include, for example, back-left straight, back-right straight, back-down straight, circling left, circling right, loop up, loop down. The shape, size, angle of the lip 360 as well as the lure body dictate this type of motion. In addition, functionality can be added to the lure 300 that would allow the fisherman to adjust such features as pitch and direction. For instance, moving weight toward the front or rear of the lure 300 would alter the pitch as well as cause the lure to "yaw" a bit to the left or right during propulsion. Additionally, adjusting the angle that the propeller shaft connects to the lure body would alter the direction that the lure propels itself.

It is also envisioned that certain embodiments of lure can be weighted and configured to sit in the bottom of the water, since there are fish that feed on other fish on the bottom of the water. It may be desired to provide motion to skip along the bottom. Similarly, certain embodiments of lure 300 may be used by surf casters in the ocean. The surf casters may cast out and retrieve for a certain distance, then provide self-propelled motion.

Certain embodiments of lure 300 could be configured to achieve a specific purpose. For instance, proper weighting, buoyancy, propeller, torque and propulsion direction could make a lure 300 "crawl" over rocks along the bottom and imitate a crawfish. Alternatively, a lure 300 could be engineered to "paddle" along the top of the water like a mouse or frog, or to sit at the top of the water.

In view of these and other numerous possible changes to the described embodiments, it is understood therefore that this invention is not limited to the particular embodiments disclosed, but is intended to cover modifications within the spirit and scope of the present invention as defined in the appended claims.

What is claimed is:

1. An apparatus used for fishing, comprising:

a fishing lure coupled to a fishing line that pulls the lure through water in a forward direction;

wherein the fishing lure stores potential energy in an energy storage device as the lure moves through the water in the forward direction;

wherein the fishing lure moves in a rearward direction through the water by converting the potential energy into kinetic energy that propels the fishing lure in the rearward direction; and wherein the energy storage device is a spring housed in a gear box, and the gear box includes a plurality of openings at least one of which mates with an outside surface of the spring;

wherein at least one of the openings holds the spring in place while the spring winds up to a threshold tension; and wherein winding of the spring beyond the threshold tension causes the outside surface of the spring to rotate about the openings.

2. An apparatus used for fishing, comprising:

a fishing lure coupled to a fishing line that pulls the lure through water in a forward direction;

wherein the fishing lure stores potential energy in an energy storage device as the lure moves through the water in the forward direction; and wherein the fishing lure remains in a substantially stationary position in the water by converting the potential energy into kinetic energy that supplies a force that balances an equal and opposite force supplied by the fishing line;

wherein the energy storage device is a spring housed in a gear box, and the gear box includes a plurality of openings at least one of which mates with an outside surface of the spring;

wherein at least one of the openings holds the spring in place while the spring winds up to a threshold tension; and wherein winding of the spring beyond the threshold tension causes the outside surface of the spring to rotate about the openings.

3. A fishing lure, comprising:

(a) a body section coupled to a fishing line that pulls the lure through water, wherein the body section includes an exposed pocket that can be accessed by a user of the lure without disassembly of the body section;

(b) a propeller; and (c) an energy storage device positioned in the body section and coupled to the propeller;

wherein the energy storage device stores potential energy as the lure is pulled through the water;

wherein the energy storage device is a spring housed in a gear box; and wherein the gear box is a modular unit positioned in the exposed pocket in the body section, and the gear box is secured in the exposed pocket of the body section by a friction fit or dimples on the exposed pocket of the body section.

4. A fishing lure, comprising:

(a) a body section coupled to a fishing line that pulls the lure through water;

(b) a propeller; and (c) an energy storage device positioned in the body section and coupled to the propeller;

wherein the energy storage device stores potential energy as the lure is pulled through the waters;

wherein the energy storage device is a spring housed in a gear box, and the gear box includes a plurality of openings at least one of which mates with an outside surface of the spring;

wherein at least one of the openings holds the spring in place while the spring winds up to a threshold tension; and wherein winding of the spring beyond the threshold tension causes the outside surface of the spring to rotate about the openings.

5. The fishing lure of claim 4, wherein the fishing line pulls the lure in a forward direction through the water, and the potential energy is turned into kinetic energy and used to turn the propeller in a manner that propels the lure a reverse direction through the water.

6. The fishing lure of claim 4, wherein the fishing line pulls the lure in a forward direction through the water, and the potential energy is turned into kinetic energy and used to turn the propeller in a manner that maintains the lure in a substantially stationary position in the water.

7. The fishing lure of claim 4, wherein the gear box includes a plurality of gears that achieve a turning ratio between the propeller and the spring of at least 30:1.

8. The fishing lure of claim 4, wherein the body section includes fins that prevent the lure from rotating about an axis of the propeller.

9. A fishing lure system, comprising;
   (a) a lure body section that includes an exposed pocket that can be accessed by a user of the lure system without disassembly of the lure body section;
   (b) a first modular gear box sized to fit in the exposed pocket in the lure body section, the first modular gear box including a first energy storage device coupled to a first propeller having a first color, wherein the first energy storage device stores potential energy when the first modular gear box is disposed in the exposed pocket and the lure body section is pulled through the water;
   (c) a second modular gear box sized to fit in the exposed pocket in the lure body section, the second modular gear box including a second energy storage device coupled to a second propeller having a second color, the first color being different from the second color, wherein the second energy storage device stores potential energy when the second modular gear box is disposed in the exposed pocket and the lure body section is pulled through the water;

wherein either the first modular gear box or the second modular gear box is manually secured by a user in the exposed pocket in the lure body section by a friction fit or dimples on the lure body section without disassembly of the lure body section.

10. A method for fishing, comprising the steps of:
   (a) pulling a fishing lure through water in a forward direction;
   (b) storing potential energy in an energy storage device disposed in the lure during step (a); and
   (c) relaxing tension on a fishing line coupled to the lure;

wherein, after the relaxing step, the potential energy stored in the lure is converted into kinetic energy that alters the movement of the lure in the water;

wherein the energy storage device is a spring housed in a gear box, and the gear box includes a plurality of openings at least one of which mates with an outside surface of the spring;

wherein at least one of the openings holds the spring in place while the spring winds up to a threshold tension; and wherein winding of the spring beyond the threshold tension causes the outside surface of the spring to rotate about the openings.

11. The method of claim 10, wherein the kinetic energy propels the lure in a reverse direction in the water.

12. The method of claim 10, wherein the kinetic energy supplies a force that balances an equal and opposite force supplied by the fishing line.

* * * * *